(12) United States Patent
Segev et al.

(10) Patent No.: US 11,847,323 B1
(45) Date of Patent: Dec. 19, 2023

(54) DATA STORAGE DEVICE AND METHOD FOR HOST BUFFER MANAGEMENT

(71) Applicant: Western Digital Technologies, Inc., San Jose, CA (US)

(72) Inventors: Amir Segev, Meitar (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/834,051

(22) Filed: Jun. 7, 2022

(51) Int. Cl.
*G06F 3/06* (2006.01)
(52) U.S. Cl.
CPC ............ *G06F 3/061* (2013.01); *G06F 3/0656* (2013.01); *G06F 3/0688* (2013.01)
(58) Field of Classification Search
CPC ....... G06F 3/061; G06F 3/0656; G06F 3/0688
See application file for complete search history.

(56) References Cited

U.S. PATENT DOCUMENTS

| | | | |
|---|---|---|---|
| 2016/0011964 A1 | 1/2016 | Rostoker et al. | |
| 2018/0136875 A1* | 5/2018 | Nimmagadda | G06F 3/0679 |
| 2018/0260347 A1 | 9/2018 | Benisty | |
| 2019/0294350 A1 | 9/2019 | Hahn et al. | |
| 2020/0098423 A1* | 3/2020 | Huang | G11C 11/419 |
| 2020/0151040 A1 | 5/2020 | Lee et al. | |
| 2020/0204503 A1* | 6/2020 | Cornett | H04L 49/901 |
| 2021/0223994 A1* | 7/2021 | Kanno | G06F 3/0679 |
| 2023/0112869 A1* | 4/2023 | Hwang | G06F 3/0679 |
| | | | 711/154 |

FOREIGN PATENT DOCUMENTS

CN 107665091 B 3/2021

* cited by examiner

*Primary Examiner* — Michelle T Bechtold
(74) *Attorney, Agent, or Firm* — Crowell & Moring LLP (57) ABSTRACT

A data storage device and method for host buffer management are provided. In one embodiment, a data storage device is provided comprising a non-volatile memory and a controller. The controller is configured to receive a read command from a host; read data from the non-volatile memory; identify a location in a host memory buffer (HMB) in the host that is available to store the data; write the data to the location in the HMB; and inform the host of the location in the HMB that stores the data. Other embodiments are possible, and each of the embodiments can be used alone or together in combination.

17 Claims, 8 Drawing Sheets

DATA STORAGE DEVICE AND METHOD FOR HOST BUFFER MANAGEMENT

BACKGROUND

A host can read data from a memory in a data storage device. In some environments, during a read operation, a host allocates space in its volatile memory for buffers to store the requested data and for a pointer list with pointers that point to the allocated buffers. The data storage device reads a read command and the pointer list from the host's memory. After the data storage device reads the requested data from its memory, the data storage device writes the data in the buffer location in the host, as pointed to by the pointer list. The data storage device then informs the host that the read operation is complete. In response, the host reads the pointer lists to determine the location in the host's volatile memory where the data is stored, reads the data from that location, and then releases the space in the volatile memory that was allocated for the buffer and the pointer list.

DETAILED DESCRIPTION

Overview

By way of introduction, the below embodiments relate to a data storage device and method for host buffer management. In one embodiment, a data storage device is provided comprising a non-volatile memory and a controller. The controller is configured to receive a read command from a host; read data from the non-volatile memory; identify a location in a host memory buffer (HMB) in the host that is available to store the data; write the data to the location in the HMB; and inform the host of the location in the HMB that stores the data.

In some embodiments, the controller, not the host, is responsible for managing where the data is written in the host.

In some embodiments, the controller comprises: a resource server configured to manage memory allocation in the HMB; and a direct memory access module configured to send a request to the resource server to identify the location in the HMB that is available to store the data.

In some embodiments, the controller is further configured to inform the host of the location in the HMB by storing a completion queue entry in a completion queue, wherein the completion queue entry comprises a pointer to the location.

In some embodiments, the controller is further configured to receive, from the host, an indication that the location in the HMB can be released.

In some embodiments, the controller is further configured to release the location in response to receiving the indication.

In some embodiments, the controller is further configured to inform the host of the location in the HMB by sending a pointer to the host; and receiving the indication from the host comprises receiving the pointer back from the host.

In some embodiments, the controller is further configured to receive the read command by fetching the read command from a submission queue in the host in response to determining a doorbell register indicates that the read command is available to be fetched from the submission queue.

In some embodiments, the data storage device further comprises a volatile memory, wherein the controller is further configured to store the data in the volatile memory after the data is read from the non-volatile memory but before the data is written to the location in the HMB.

In some embodiments, the controller is further configured to error correct the data prior to writing the data to the location in the HMB.

In some embodiments, the data storage device comprises a solid-state drive (SSD).

In some embodiments, the non-volatile memory comprises a three-dimensional memory.

In another embodiment, a method is provided that is performed in a host in communication with a data storage device. The method comprises: generating a request for data stored in the data storage device; receiving, from the data storage device, a pointer to a location in a memory in the host where the data storage device stored the data after executing the request; reading the data from the location in the memory; and informing the data storage device that the location in the memory can be released.

In some embodiments, the data storage device, not the host, is responsible for managing where the data is written in the host.

In some embodiments, a resource server in the data storage device is responsible for managing where the data is written in the host.

In some embodiments, the memory in the host comprises a host memory buffer (HMB).

In some embodiments, the pointer is received in a completion queue entry written in a completion queue by the data storage device.

In some embodiments, informing the data storage device that the location in the memory can be released comprises sending the pointer back to the data storage device.

In some embodiments, the method further comprises placing the read command in a submission queue; and informing the data storage device that the read command is ready to be fetched from the submission queue.

In another embodiment, a data storage device is provided comprising a memory and means for responding to a read command from a host by: reading data from the memory; selecting a location in host memory that is available to store the data; writing the data to the location in the host memory; and informing the host of the location in the host memory that stores the data.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
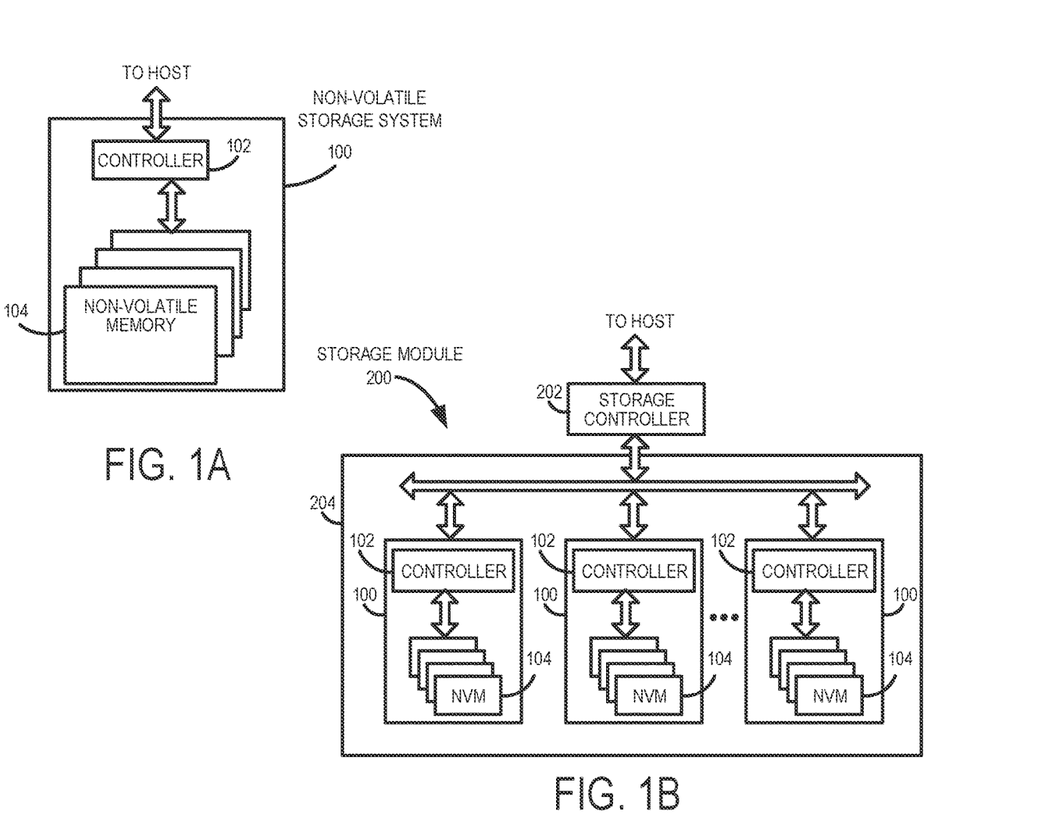
FIG. 1A is a block diagram of a data storage device of an embodiment.
FIG. 1B is a block diagram illustrating a storage module of an embodiment.
Figure 1C:
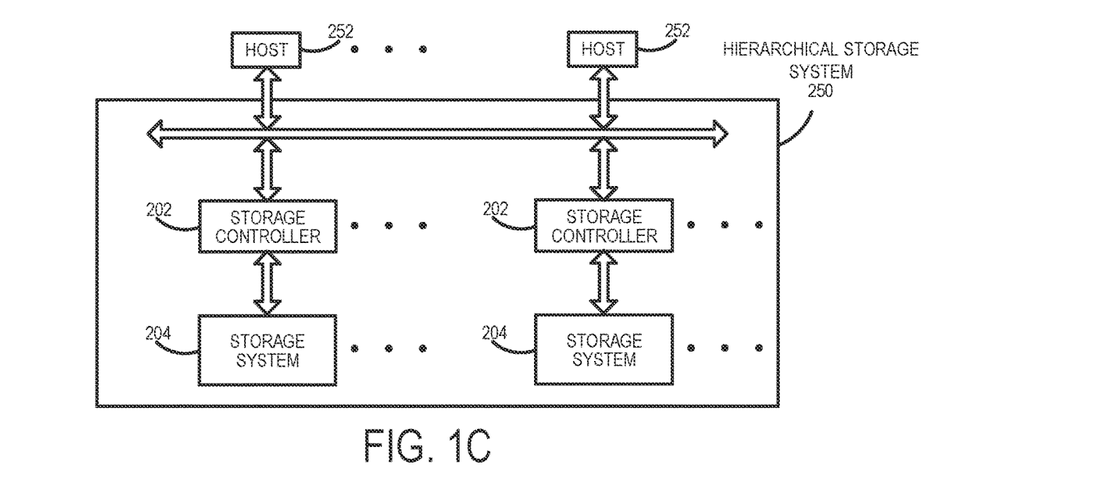
FIG. 1C is a block diagram illustrating a hierarchical storage system of an embodiment.

Data storage devices suitable for use in implementing aspects of these embodiments are shown in FIGS. 1A-IC. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
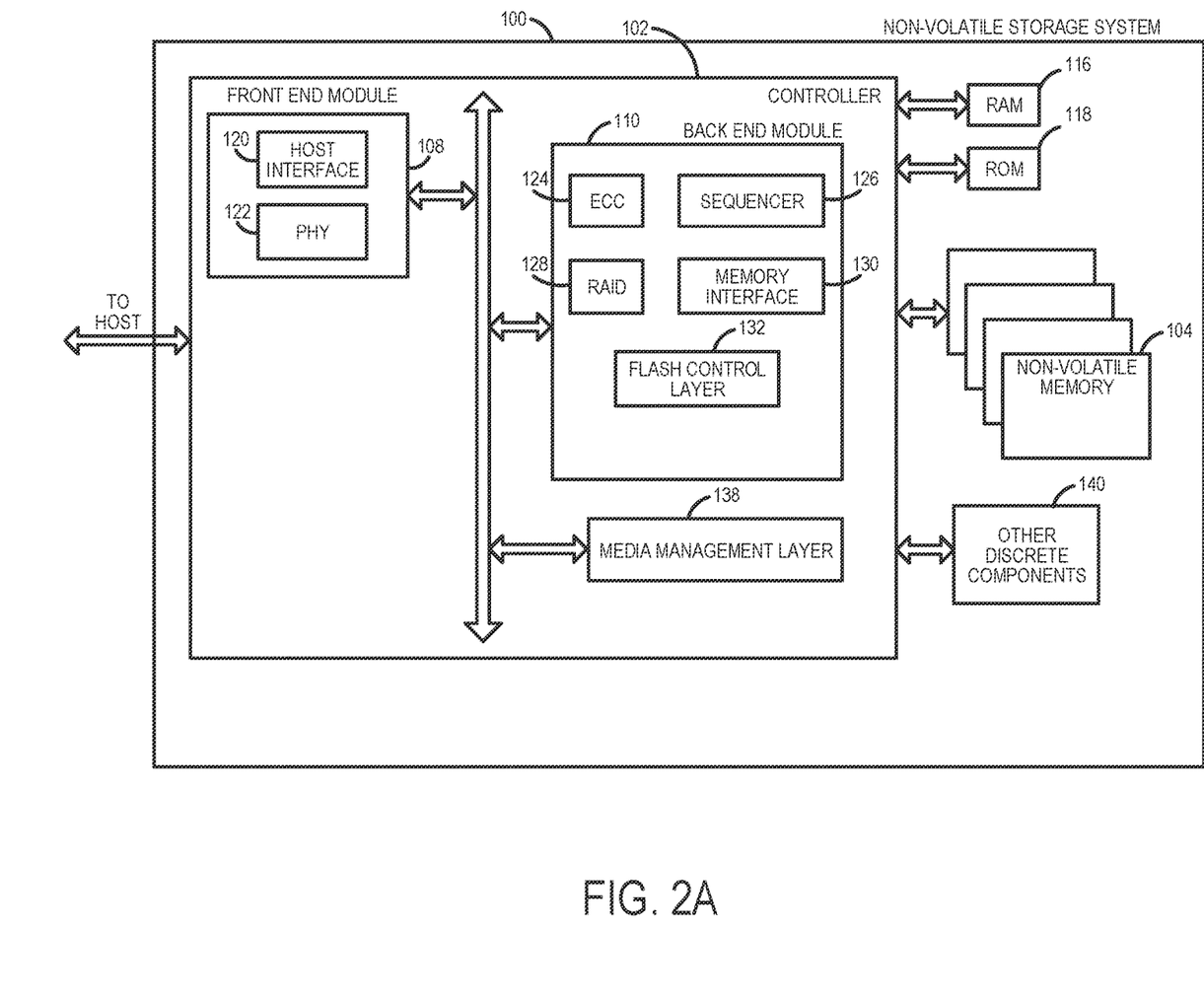
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
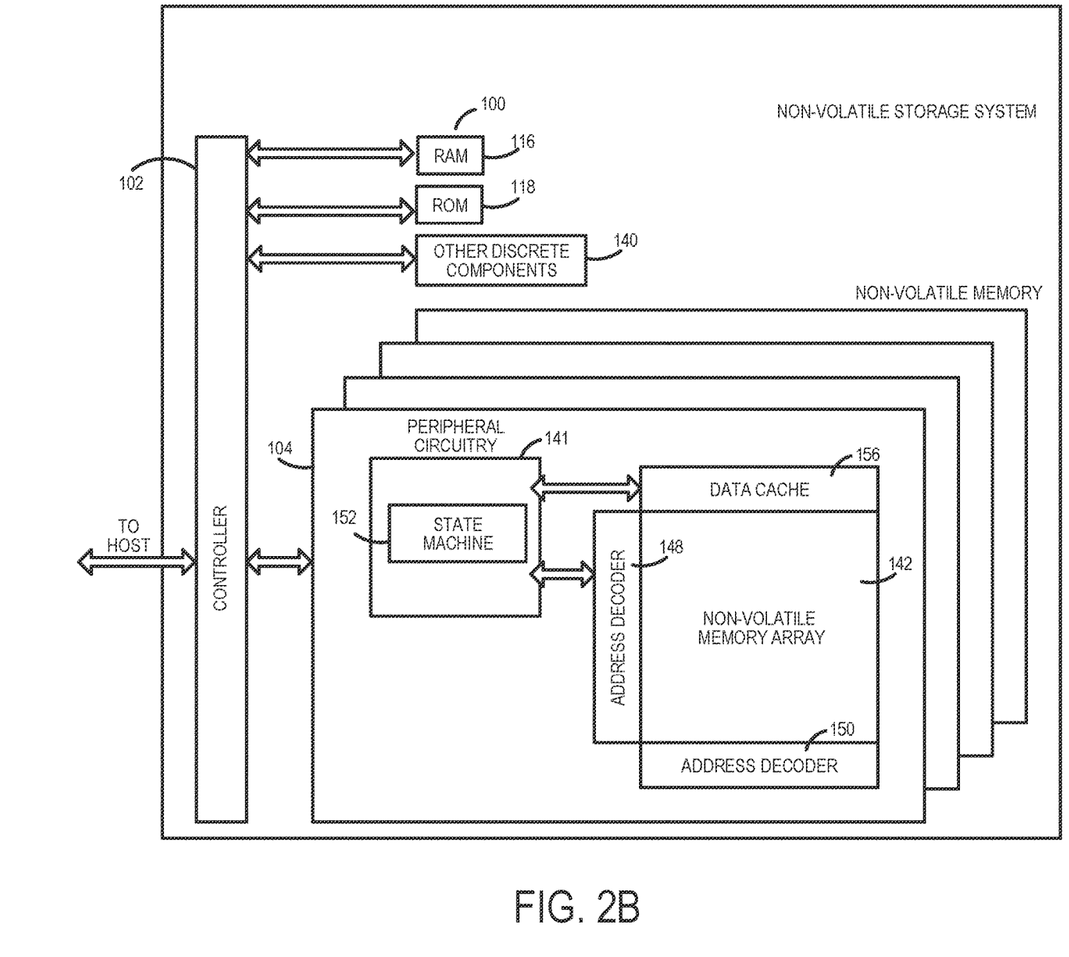
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
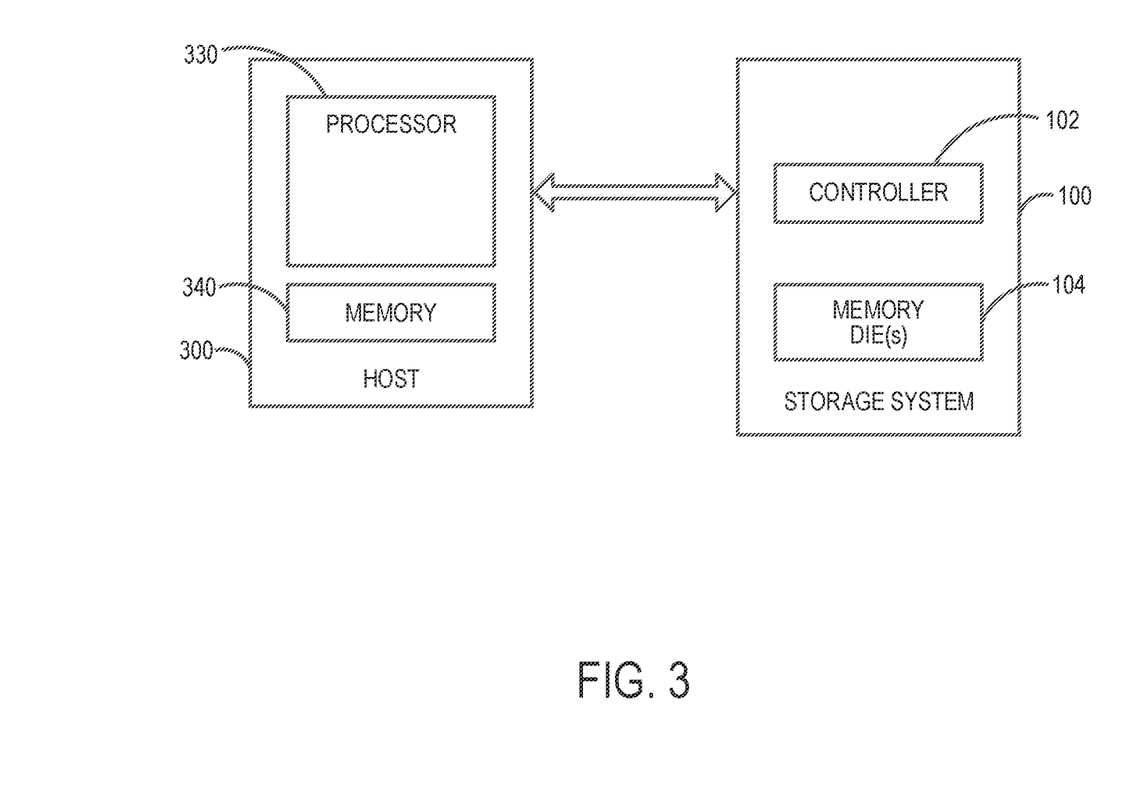
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
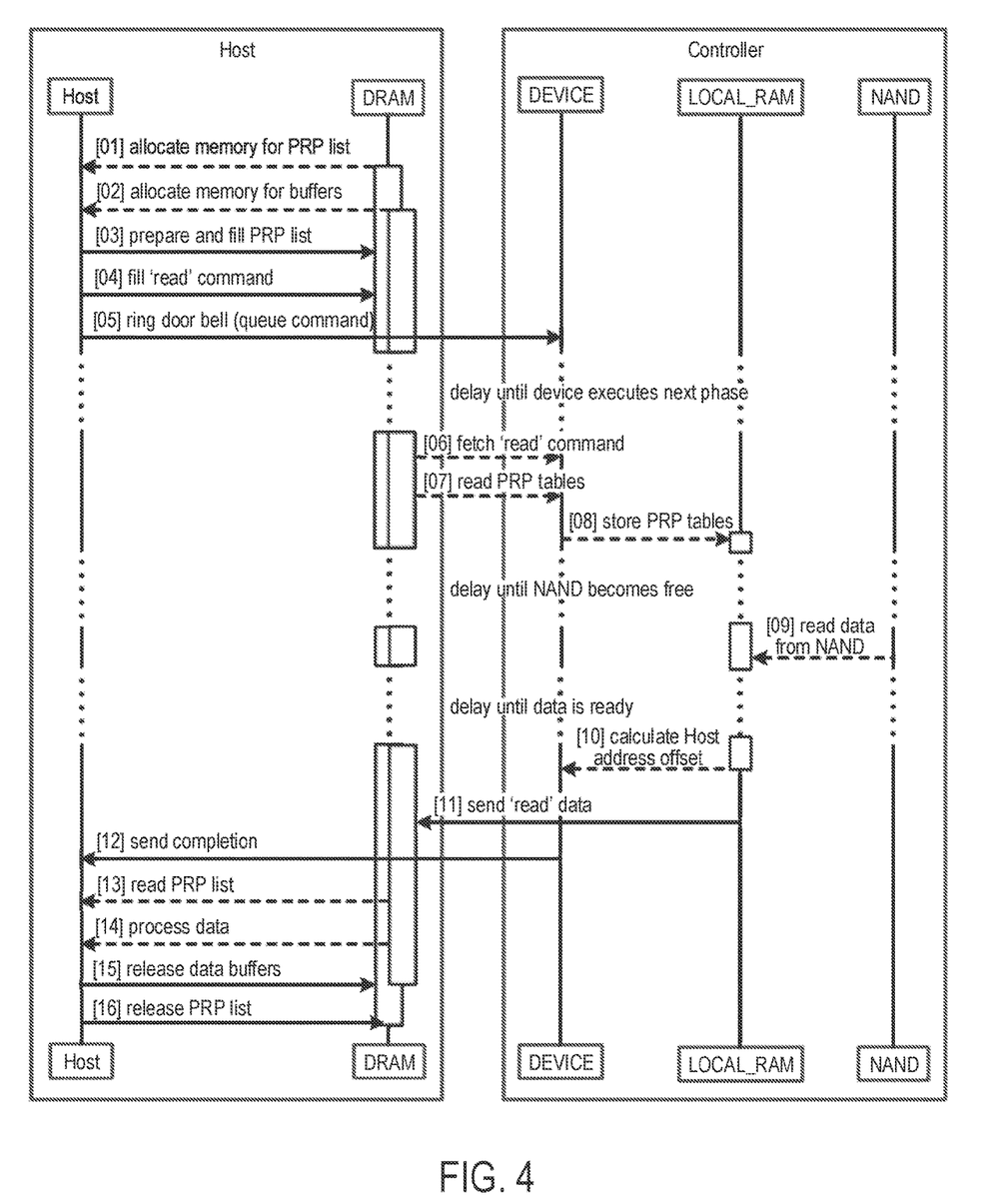
FIG. 4 is a diagram illustrating a read command flow of an embodiment.

As mentioned above, in some data storage devices, such as NVMe SSD devices, when a host is doing a read command, many control operations are involved on the host side, and many unused resources are allocated ahead of time in both the host and the data storage device. FIG. 4 is a read-command flow diagram that illustrates this issue. As shown in FIG. 4, the host allocates space for pointers (act 1) and allocates space for data buffers (act 2). Then, the host prepares the list of pointers that point to the buffers (act 3) and also prepares a command that includes pointers to a physical region page (PRP) list (act 4). Those items are stored in a queue in the host's volatile memory (e.g., DRAM). The host informs the data storage device that a command is ready in the queue by ringing a doorbell (e.g., setting a bit in a doorbell register) (act 5), and, later, when the data storage device is free, the data storage device fetches the read command from the queue in the host (act 6). The data storage device parses the command and fetches the PRP pointers (act 7) and stores the PRP pointers in a temporary memory (e.g., its local RAM) (act 8). Later, when the non-volatile memory (e.g., NAND) is not busy and can service the read command, the controller of the data storage device reads the data from the non-volatile memory and stores it in its local RAM (act 9). After data is error corrected (if needed), the controller reads the locally-stored PRP and calculates a host offset address (act 10), so that it can write the data to the buffer location in the host that is pointed to by the pointers provided in the PRP list (act 11). The data storage device then informs the host that the command is complete and that the data is ready for the host to read it the host's buffer in DRAM (act 12). In response, the host re-reads the PRP list to determine which buffer location to read (act 13) and then reads and uses the data it requested (act 14). At that point, the host can release the data buffers (act 15) and release the PRP list (act 16), so the buffer locations pointed to by the pointers can be released and repurposed for another read command.

In this process, a temporary/random allocated memory of the PRP list and the empty read buffers are reserved. Only at act 11 does the memory allocated for the data buffers become available. Also, on the data storage device side, the local copy of the PRP list in the randomly-allocated memory is prepared ahead of time in act 8 and is held until act 10. This approach requires ahead-of-time buffer allocation done by the host. It also can require allocating the buffers ahead of time before using them. In order to support full throughput, more buffers are required since the life cycle of each buffer is longer. Also, as indicated by the fast-pace adoption in the industry of the zone-append command, the host prefers if the data storage device offloads as much management as possible (e.g., in zone-append, the logical block address (LBA) of the write commands).

The following embodiments can be used to offload work from the host 300 and move to a just-in-time memory allocation scheme. In one embodiment, the host 300 performs a read and gets the location of the data in the response. This will offload the management of PRP lists from the host and reduces the amount of time that randomly-allocated memory is allocated and stays empty. In addition, these embodiments can improve the latency of read commands and reduce the complexity related to PRP fetching in out-of-order data transfer modes.

Figure 5:
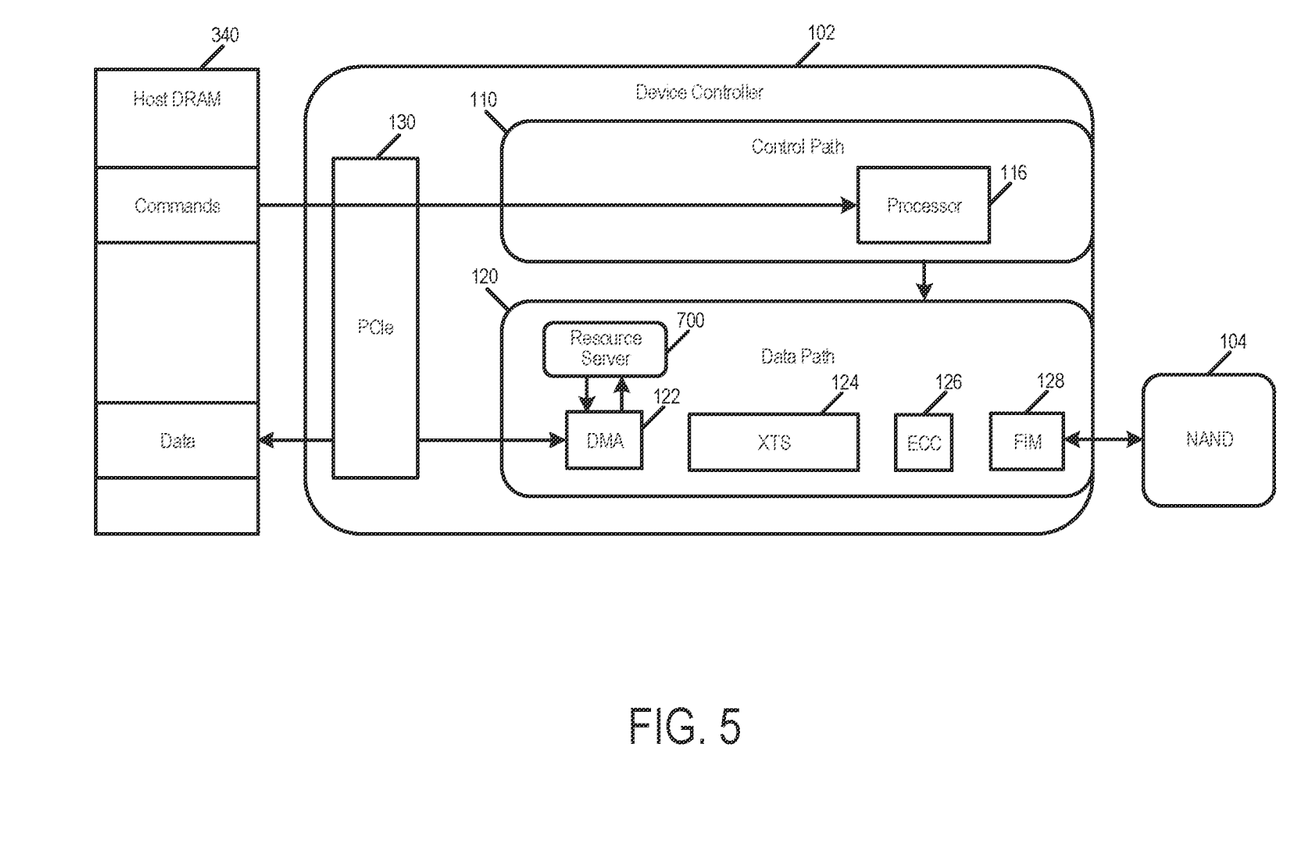
FIG. 5 is a block diagram of a host and data storage device of an embodiment.

Turning again to the drawings, FIG. 5 is a block diagram of a host 300 and a controller 102 and non-volatile memory (e.g., NAND) 104 of a data storage device 100 of an embodiment. Additional or different components, including those mentioned above, can be used. As shown in FIG. 5, in this embodiment, the controller 102 of the data storage device 100 comprises a PCIe host interface 130, a control path 110, and a data path 120 between the host 300 and the non-volatile memory 104. The controller path 110 comprises a processor 116 and receives commands from the host 300 and triggers the modules in the data path 120. The data path 120 comprises a flash interface module 128 to read data from the non-volatile memory 104, an error correction code module 126 to perform any required error correction, an encryption/decryption (XTS) module 124 to decrypt read data, a direct memory access (DMA) module 122 to write data to the host 300, and a resource server 700.

In this embodiment, the resource server 700 is configured (e.g., via computer readable-program code executed by the controller 102 and/or hardware) to manages the memory allocation in a host memory buffer (HMB) in the volatile memory 340 in the host 300. When the DMA module 122 wants to transfer data (and, later, a completion) to the host 300, the DMA module 122 requests a free memory range from the resource server 700. In this way, the resource server 700 provides HMB memory management. This process is illustrated in HMB read flow diagram in FIG. 6.

Figure 6:
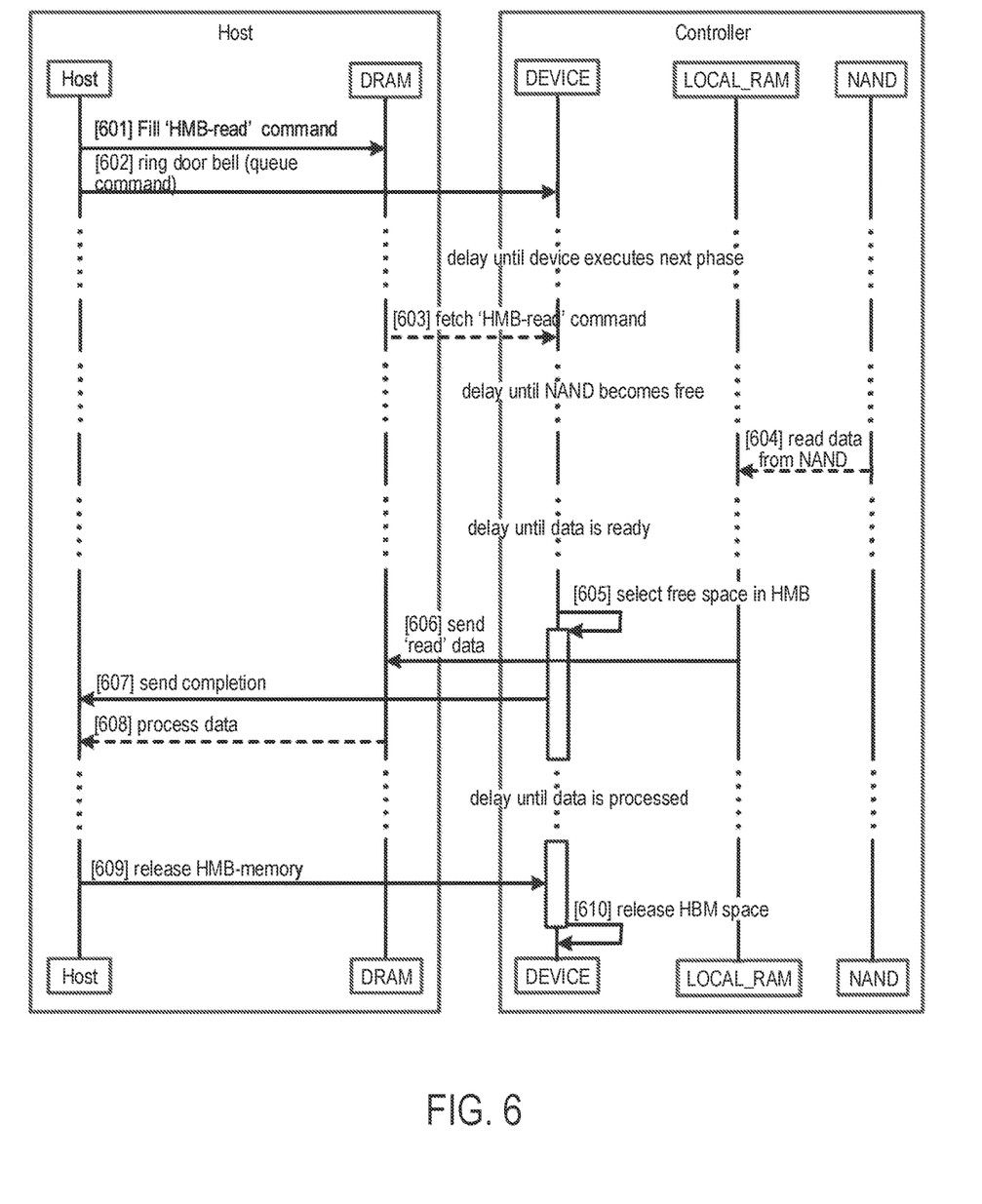
FIG. 6 is a diagram illustrating a host memory buffer (HMB)-read command flow of an embodiment.

As shown in FIG. 6, the host 300 fills-in a read command in a queue in the host's volatile memory (e.g. DRAM) (act 601) and informs the data storage device 100 that a command is ready by ringing a doorbell (act 602). Note, that the host 300 is not allocating space for a data buffer or pointer list because the host 300 is not managing its buffers in this embodiment. Later, when the data storage device 100 is free, the controller 102 fetches the read command from the queue in the host 300 (act 603). Later, when the non-volatile memory 104 is not busy and can service the read command, the controller 102 reads the data from the non-volatile memory 104 and stores the data in local volatile memory (e.g., RAM) in the data storage device 100 (act 604). Later, after correcting for any errors, the controller 102 selects free space in the host memory buffer (HMB) to store the data (e.g., the DMA module 122 and request the free space from the resource server 700) (act 605). The controller 102 then writes the data to the selected location in the HMB (act 606) and informs the host 300 that the command is completed and that the data is ready to be read from the HMB (act 607). The host 300 can then read and use the data it requested (act 608). Later, after data is no longer required, the host 300 can suggest to the data storage device 100 that the buffers can be released (act 609). In response, the controller 102 can mark the range as free (act 610).

Figure 7:
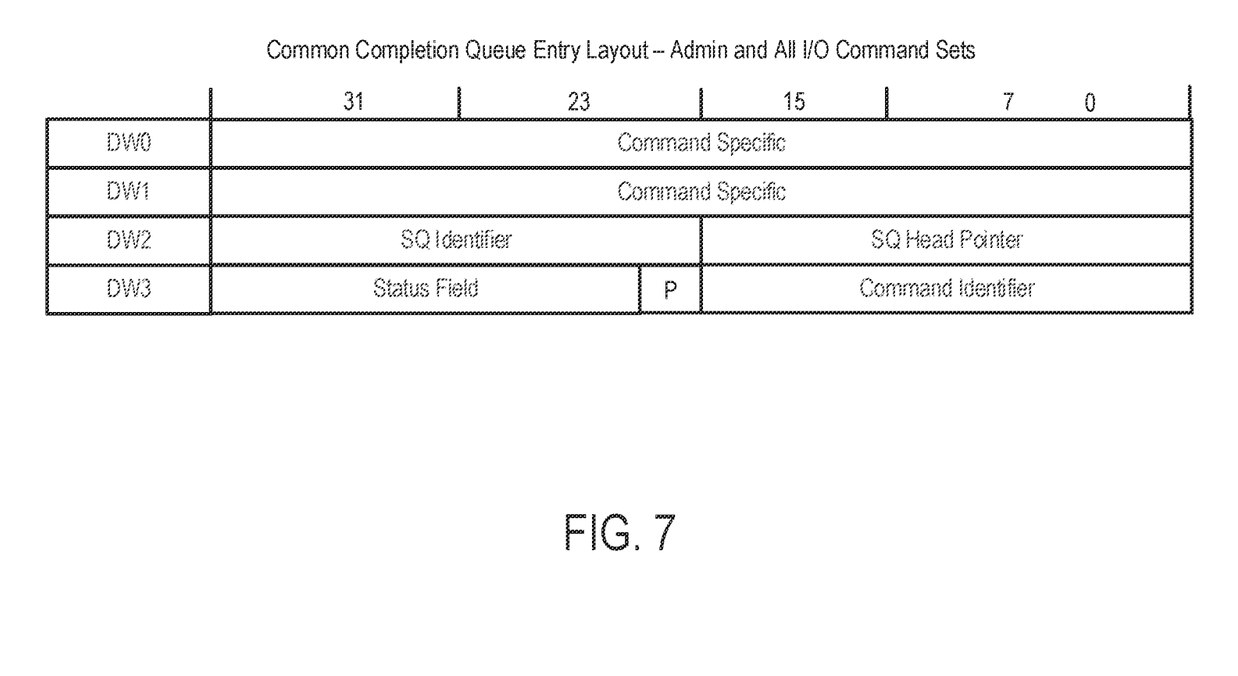
FIG. 7 is an illustration of a completion queue entry layout of an embodiment.

Following the zoned namespace (ZNS) concept, the host 300 can be informed of the data location in the completion. For example, the completion queue entry layout shown in FIG. 7 can be used, with command-specific fields (DW0, DW1) holding a pointer to the address of the data (e.g., the PRP list) in the host's DRAM. When the host 300 finishes reading the command, it can inform the data storage device 100 by providing the PRP list that was generated by the data storage device 100. The control path of the controller 102 can interact with the resource server 700 to release the buffers, so they can be reused for next commands.

There are several advantages associated with these embodiments. For example, with these embodiments, the host 300 can reduce a lot of overhead in buffer management. These embodiments also allow resources to be allocated "just in time" and (due to removing the PRP fetching phase) can reduce latency because fewer read transactions go over the PCIe interface. These embodiments also simplify out-of-order data transfer on read operations.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a non-volatile memory; and
a controller configured to:
receive a read command from a host;
read data from the non-volatile memory;
identify a location in a host memory buffer (HMB) in the host that is available to store the data;

write the data to the location in the HMB;

inform the host of the location in the HMB that stores the data by sending, to the host, a pointer to the location; and receive the pointer back from the host, wherein receiving the pointer back from the host is an indication that the location in the HMB can be released.

2. The data storage device of claim 1, wherein the controller, not the host, is responsible for managing where the data is written in the host.

3. The data storage device of claim 1, wherein the controller comprises:

a resource server configured to manage memory allocation in the HMB; and direct memory access circuitry configured to send a request to the resource server to identify the location in the HMB that is available to store the data.

4. The data storage device of claim 1, wherein the controller is further configured to inform the host of the location in the HMB by storing a completion queue entry in a completion queue, wherein the completion queue entry comprises the pointer.

5. The data storage device of claim 1, wherein the controller is further configured to release the location in response to receiving the pointer back from the host.

6. The data storage device of claim 1, wherein the controller is further configured to receive the read command by fetching the read command from a submission queue in the host in response to determining a doorbell register indicates that the read command is available to be fetched from the submission queue.

7. The data storage device of claim 1, further comprising a volatile memory, wherein the controller is further configured to store the data in the volatile memory after the data is read from the non-volatile memory but before the data is written to the location in the HMB.

8. The data storage device of claim 1, wherein the controller is further configured to error correct the data prior to writing the data to the location in the HMB.

9. The data storage device of claim 1, wherein the data storage device comprises a solid-state drive (SSD).

10. The data storage device of claim 1, wherein the non-volatile memory comprises a three-dimensional memory.

11. A method comprising:
performing the following in a host in communication with a data storage device:

generating a request for data stored in the data storage device;

receiving, from the data storage device, a pointer to a location in a memory in the host where the data storage device stored the data after executing the request;

reading the data from the location in the memory; and informing the data storage device that the location in the memory can be released by sending the pointer back to the data storage device.

12. The method of claim 11, wherein the data storage device, not the host, is responsible for managing where the data is written in the host.

13. The method of claim 11, wherein a resource server in the data storage device is responsible for managing where the data is written in the host.

14. The method of claim 11, wherein the memory in the host comprises a host memory buffer (HMB).

15. The method of claim 11, wherein the pointer is received in a completion queue entry written in a completion queue by the data storage device.

16. The method of claim 11, further comprising:
placing the read command in a submission queue; and
informing the data storage device that the read command is ready to be fetched from the submission queue.

17. A data storage device comprising:
a memory; and
means for responding to a read command from a host by:
reading data from the memory;
selecting a location in host memory that is available to store the data;
writing the data to the location in the host memory;
informing the host of the location in the host memory that stores the data by sending, to the host, a pointer to the location; and
receiving the pointer back from the host, wherein receiving the pointer back from the host is an indication that the location in a host memory buffer an be released.

* * * * *